(12) United States Patent
Tada et al.

(10) Patent No.: US 7,558,024 B2
(45) Date of Patent: Jul. 7, 2009

(54) LOAD/UNLOAD-TYPE HEAD SUSPENSION AND METHOD OF PROCESSING THE SAME

(75) Inventors: Hajime Tada, Yokohama (JP); Masao Hanya, Yokohama (JP); Takashi Horiuchi, Yokohama (JP); Noriyuki Saito, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 489 days.

(21) Appl. No.: 11/332,745

(22) Filed: Jan. 13, 2006

(65) Prior Publication Data

US 2006/0171079 A1    Aug. 3, 2006

(30) Foreign Application Priority Data

Jan. 14, 2005    (JP)    ............................. 2005-007624

(51) Int. Cl.
*G11B 5/54* (2006.01)

(52) U.S. Cl. .................................... 360/255; 360/255.9

(58) Field of Classification Search .............. 360/254.6, 360/255, 255.5, 255.9
See application file for complete search history.

(56) References Cited

U.S. PATENT DOCUMENTS

| | | | |
|---|---|---|---|
| 6,181,529 B1 * | 1/2001 | Aoyagi et al. | 360/255 |
| 6,288,876 B1 * | 9/2001 | Albrecht et al. | 360/245.3 |
| 2004/0240116 A1 * | 12/2004 | Kuwajima et al. | 360/255 |
| 2005/0030671 A1 * | 2/2005 | Lee et al. | 360/255 |

FOREIGN PATENT DOCUMENTS

| | | | |
|---|---|---|---|
| JP | 10302421 A | * | 11/1998 |
| JP | 11-096527 | | 4/1999 |

* cited by examiner

*Primary Examiner*—William J Klimowicz
(74) *Attorney, Agent, or Firm*—Jordan and Hamburg LLP

(57) ABSTRACT

A load/unload-type head suspension is capable of suppressing frictional coefficient variations. The head suspension has a head and a tab that is slid and guided along a ramp block in a read/write apparatus, to move the head away from a hard disk to a retract position. The tab is provided with microscopic irregularities to suppress frictional coefficient variations when the tab is guided along the ramp block. A center line average roughness (Ra) of the microscopic irregularities being greater than 0.2 μm or smaller than 0.6 μm.

2 Claims, 19 Drawing Sheets w/o Coining

15um Coining

19um Coining

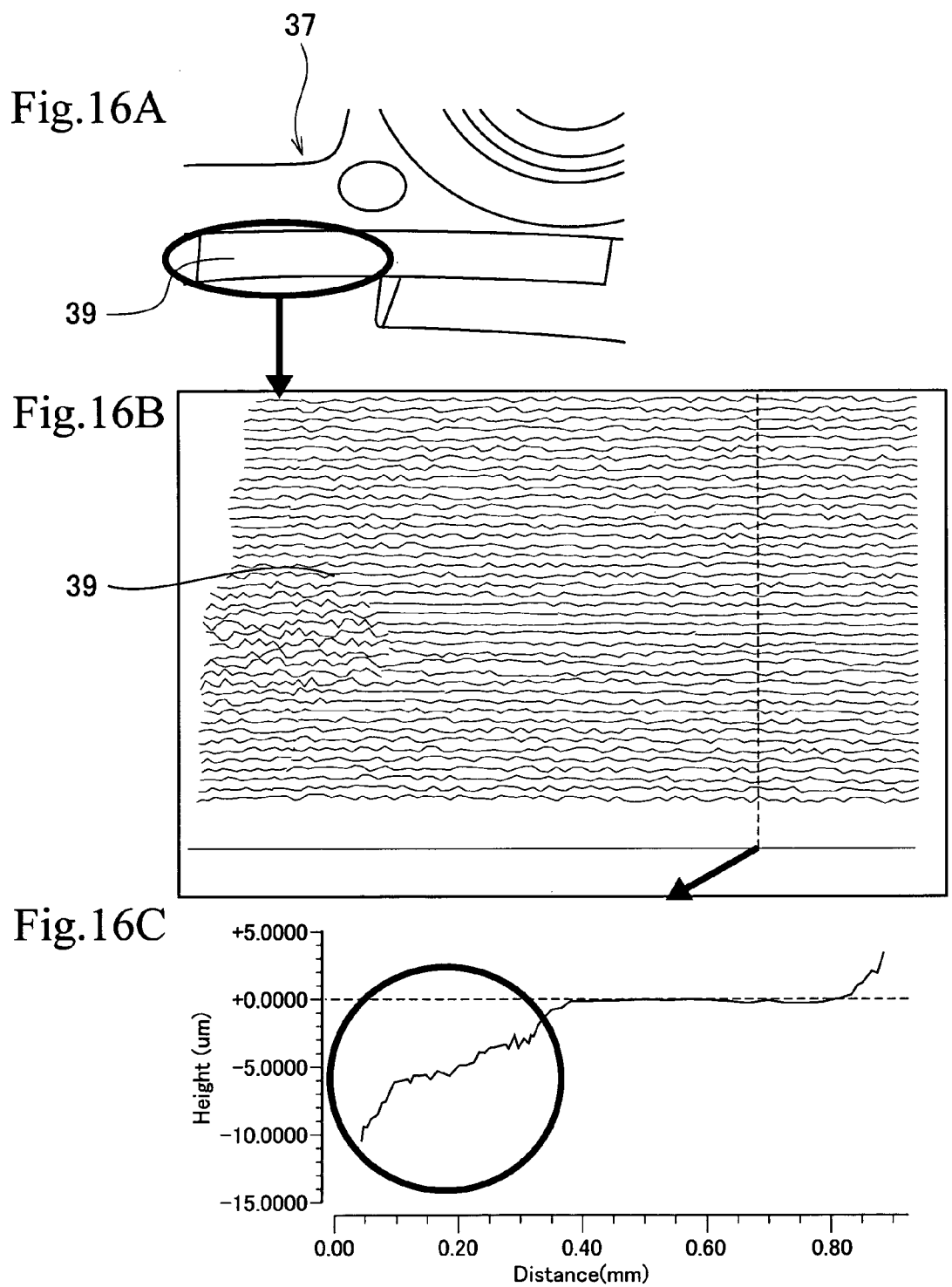

Ra:0.216

Ra:0.134

Ra 0.228

Ra 0.148

Ra 0.155

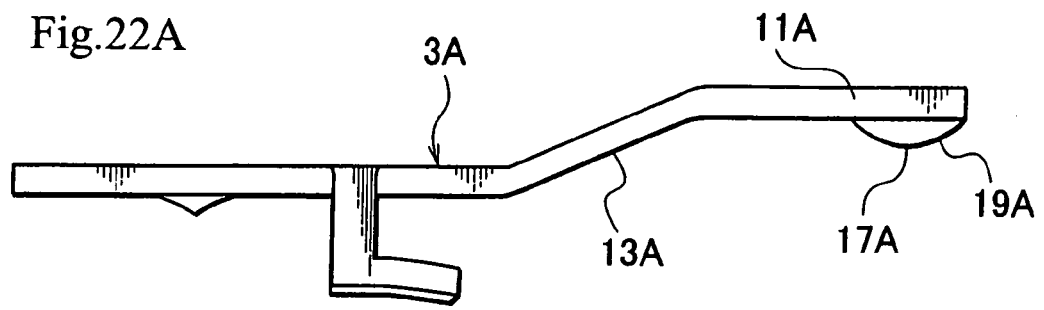
Fig.22A
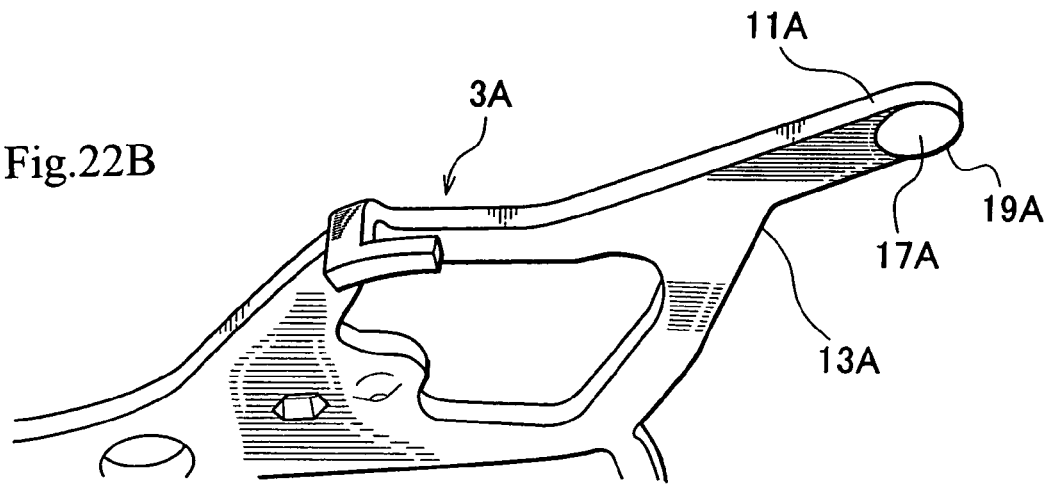
Fig.22B
Fig.23
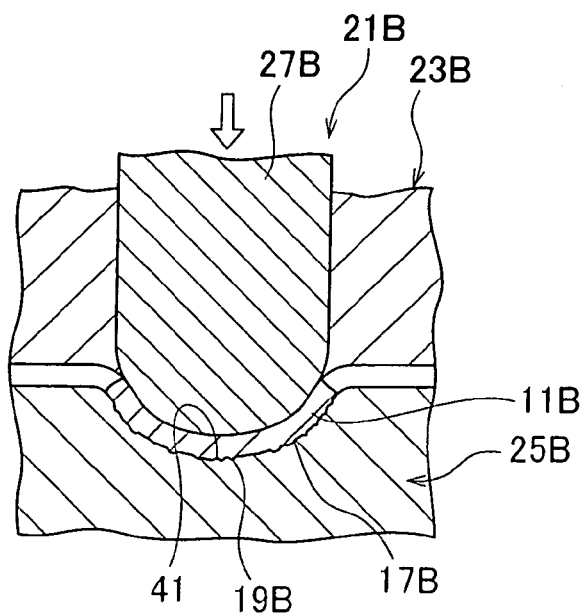

LOAD/UNLOAD-TYPE HEAD SUSPENSION AND METHOD OF PROCESSING THE SAME

BACKGROUND OF THE INVENTION

1. Field of the Invention

The present invention relates to a load/unload-type head suspension for supporting a slider of a disk drive incorporated in an information processor such as a personal computer.

2. Description of Related Art

A hard disk drive (HDD) such as a magnetic disk drive employs hard disks that are rotated at high speed. On each rotating hard disk, a slider attached to a head of a head suspension is slightly floated to write and read data to and from the hard disk through a transducer incorporated in the slider. The head with the slider is supported with the head suspension so that the slider may be slightly raised from the hard disk.

When stopping the disks, the magnetic disk drive must retract the slider from recording tracks of the hard disk. For this, there are two known methods, i.e., a contact start/stop (CSS) method and a load/unload (LUL) method.

The CSS method moves, when the hard disk is stopped, a front end of the head suspension to a CSS area prepared along an inner circumference of the hard disk. To avoid the slider from being attracted to the surface of the stopped hard disk, the surface of the CSS area of the hard disk is slightly roughened. The CSS area, therefore, is not usable as a recording area, to decrease a recording capacity. Increasing a recording capacity may be achieved by lowering the fly height of the slider. The roughened surface of the CSS area of the hard disk, however, prevents the lowering of the fly height.

The LUL method is also called a ramp load method. A ramp block made of synthetic resin is arranged at a side of the hard disk. When the hard disk is stopped, the head suspension is moved to a retract position. At this time, a tab (load bar, ramp contact, or corner) formed at a front end of the head is slid and guided along a slope of the ramp block so that the slider may be separated away from the hard disk.

The LUL method is capable of preventing the slider and the hard disk from being damaged even if a shock or vibration is applied to the disk drive while the disk drive is being carried. The LUL method allows the surface of the hard disk to be uniformly smoothed to the maximum, to thereby lower the fly height, open the inner circumferential area of the hard disk for data recording, and increase the recording capacity. During the use of the computer, the hard disk drive can be safely stopped if it is not used, to save electricity.

For the LUL method, an unload operation of the head suspension must be carried out smoothly. For this, an important factor is the magnitude of unload force (UL force) "f" acting on the tab during the unload operation.

FIG. 24 is a view explaining force acting on the tab when the tab is slid and guided along a ramp block. In FIG. 24, the tab 101 climbs a slope 105 of the ramp block 103. At this time, the tab 101 receives unload force f, vertical reaction N due to load F that presses the tab 101 to the ramp block 103, and frictional force μN along the slope 105 based on a frictional coefficient, between the tab 101 and the ramp block 103.

If the slope 105 has an inclination angle of θ, a ratio α between the load F and the unload force f is expressed as follows:

$$\alpha = f/F = (\sin\theta + \mu\cos\theta)/(\cos\theta - \mu\sin\theta)$$

This expression indicates that the unload force f is dependent on the inclination angle θ, load F, and frictional coefficient μ.

FIG. 25 is a graph showing relationships among frictional coefficients, inclination angles, and unload force.

To expand the recording area of a hard disk, the disk must be used up to the outer circumference thereof within a limited space of the hard disk drive. In the limited space of the hard disk drive, the slider must be raised from the hard disk and moved to a retract position of the ramp block with a shortest moving distance. For such a shortest-distance unload operation, it is advantageous to increase the inclination angle θ of the ramp block 103. However, as is apparent in FIG. 25, the unload force f nonlinearly increases when the inclination angle θ exceeds about 25°. Accordingly, the inclination angle θ is usually set in the range of 15° to 25°. Dimple load of the head suspension must be high in consideration of a shock to be applied during the carrying of the hard disk drive. Generally, an upper limit of the dimple load is 3 gf, and the load F is lower than that. The smaller the frictional coefficient, the better.

FIG. 26 is a graph showing results of calculations of the unload force f with respect to various frictional coefficients. The calculations were made with a standard dimple load of 3 gf, an inclination angle θ of 18.5°, a load F of 2.3 gf, and a spring constant k of the tab 101 of 1.9 gf/mm.

In FIG. 26, a rightward-increasing part on the left side of each curve indicates that the tab 101 is climbing the slope 105. After the slope 105, the unload force f sharply decreases to a magnitude that is dependent only on a frictional coefficient. FIG. 26 shows that the unload force f is greatly dependent on the frictional coefficient. When the frictional coefficient changes from 0.1 to 0.3, the unload force f increases 1.5 times from 1 gf to 1.5 gf. This means that, in a magnetic disk drive having four head suspensions, the unload force f increases from 4 gf to 6 gf. In this way, the smooth unloading of the head suspension will be hindered if the frictional coefficient varies.

In the load/unload-type head suspension, the frictional coefficient of the tab 101 must be reduced, and in addition, variations in the frictional coefficient must be minimized (refer to, for example, Japanese Unexamined Patent Application Publication No. Hei-11-96527).

SUMMARY OF THE INVENTION

An object of the present invention is to provide a load/unload-type head suspension capable of suppressing frictional coefficient variations, as well as a method of processing such a head suspension.

In order to accomplish the objects, an aspect of the present invention provides a head suspension having a guided part provided with microscopic irregularities. The guided part is slid and guided along a guide.

Compared with a guided part that is smoothed and has no irregularities, the roughened guided part allows the head suspension to be smoothly loaded and unloaded.

BRIEF DESCRIPTION OF THE DRAWINGS

FIGS. 9A to 9C are views showing tested tabs of head suspensions, in which FIG. 9A shows a tab of a head suspension subjected to a 0-μm coining process according to an embodiment of the present invention, FIG. 9B shows a tab subjected to a 15-μm coining process, and FIG. 9C shows a tab subjected to a 19-μm coining process;

FIGS. 10A and 10B are graphs showing changes in unload force relative to changes in unload speed, in which FIG. 10A is at an unload speed of 20 mm/sec and FIG. 10B is at an unload speed of 0.4 mm/sec;

FIGS. 15A to 15C are views showing a worn state of a slope of a ramp block after a durability test carried out with a head suspension according to an embodiment of the present invention, in which FIG. 15A is a perspective view partly showing the slope of the ramp block, FIG. 15B is an enlarged perspective view partly showing the slope of FIG. 15A, and FIG. 15C is a graph showing changes in the worn state of the slope;

FIGS. 16A to 16C are views showing a worn state of a slope of a ramp block after a durability test carried out with a head suspension of a comparative example treated with a 20% coining process, in which FIG. 16A is a perspective view partly showing the slope of the ramp block, FIG. 16B is an enlarged perspective view partly showing the slope of FIG. 16A, and FIG. 16C is a graph showing changes in the worn state of the slope;

FIGS. 17A and 17B are views showing changes before and after durability tests according to an embodiment of the present invention, in which FIG. 17A shows changes in unload force before and after the durability tests and FIG. 17B shows the surface roughness of a tab after the durability tests;

FIGS. 18A and 18B are views showing changes before and after durability tests according to a comparative example, in which FIG. 18A shows changes in unload force before and after the durability tests and FIG. 18B shows the surface roughness of a tab after the durability tests;

FIGS. 19A and 19B are views showing changes before and after a durability test according to an embodiment of the present invention, in which FIG. 19A shows changes in unload force before and after the durability test and FIG. 19B shows the surface roughness of a tab after the durability test;

FIGS. 20A and 20B are views showing changes before and after a durability test according to a comparative example, in which FIG. 20A shows changes in unload force before and after the durability test and FIG. 20B shows the surface roughness of a tab after the durability test;

FIGS. 21A and 21B are views showing changes before and after a durability test according to a comparative example, in which FIG. 21A shows changes in unload force before and after the durability test and FIG. 21B shows the surface roughness of a tab after the durability test;

FIGS. 22A and 22B show a load beam of a head suspension according to a second embodiment of the present invention, in which FIG. 22A is a side view partly showing the load beam and FIG. 22B is a perspective view partly showing the load beam;

FIG. 23 is a sectional view partly showing a press used to process a head suspension according to a third embodiment of the present invention;

DETAILED DESCRIPTION OF EMBODIMENTS

Head suspensions according to embodiments of the present invention will be explained with reference to the drawings. In each embodiment, the head suspension is used in a hard disk drive, to support a head that writes and reads data to and from a disk that is rotated by a motor in the hard disk drive. Each embodiment provides the head suspension with a guided part, i.e., a tab to be guided along a guide, i.e., a ramp block. To reduce frictional coefficient changes between the guide and the guided part, each embodiment provides the guided part with microscopic irregularities.

First Embodiment

Head Suspension

Figure 1:
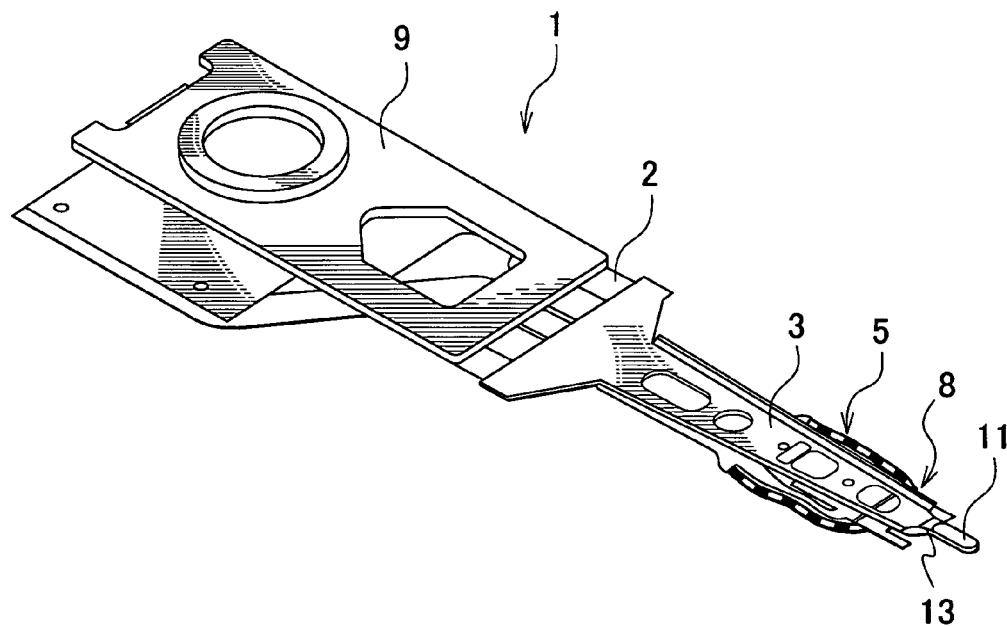
FIG. 1 is a perspective view showing a first face of a head suspension according to a first embodiment of the present invention.
Figure 2:
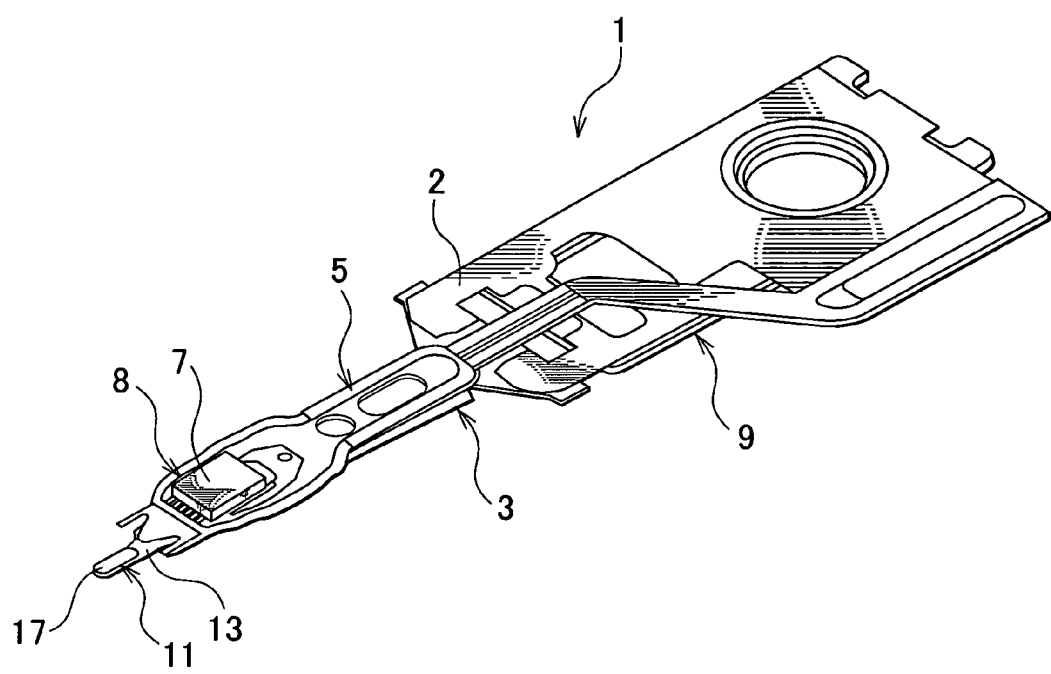
FIG. 2 is a perspective view showing a second face of the head suspension according to the first embodiment.

FIGS. 1 and 2 show a load/unload-type head suspension according to the first embodiment of the present invention, in which FIG. 1 is a perspective view showing a first face of the head suspension and FIG. 2 is a perspective view showing a second face thereof.

In FIGS. 1 and 2, the head suspension 1 is made of a precision thin plate such as a precision stainless-steel thin plate and includes a load beam 3 and a resilient flexure 5 fixed to the load beam 3. The load beam 3 includes a resilient part 2. The flexure 5 is made of, for example, a thin stainless-steel plate. A slider 7 is fixed to the flexure 5 to form a head 8. The flexure 5 is fixed to the load beam 3 by, for example, laser welding. A base plate 9 is attached to a base of the load beam 3. With the base plate 9, the load beam 3 is fixed to an arm of a carriage.

The load beam 3 may be made of austenite-based stainless steel such as SUS304 or SUS305. SUS304 is composed of C of 0.08% or below, Si of 1% or below, Mn of 2% or below, P of 0.04% or below, S of 0.03% or below, Ni of 8 to 10.5%, Cr of 18 to 20%, and Fe of the remaining part.

A front end of the load beam 3 is provided with a tab 11 serving as a load/unload guided part. The tab 11 protrudes in a longitudinal direction of the head suspension 1, i.e., a longitudinal direction, in which the load beam 3 is extended, of the load beam 3. When the head suspension 1 is loaded or unloaded with respect to the hard disk, i.e., when the head suspension 1 is moved from a retract position onto the hard disk, or away from the hard disk to the retract position, the tab 11 is guided and slid along a ramp block serving as a guide. The ramp block is arranged at a side of the hard disk in the magnetic disk drive serving as a read/write apparatus. When the hard disk is stopped, the tab 11 is slid and guided along the ramp block so that the head 8 of the head suspension 1 may be raised and moved to the retract position at the side of the hard disk. The ramp block is formed from synthetic resin such as fiber-reinforced plastics (FRP).

Details of the Tab

Figure 3:
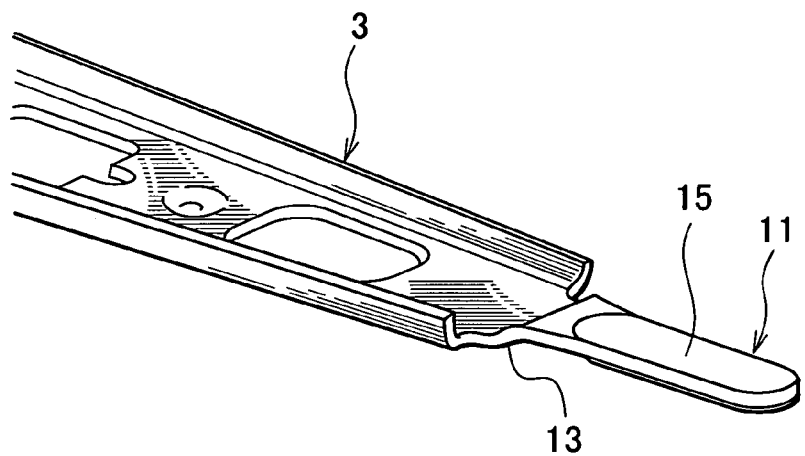
FIG. 3 is a perspective view showing a tab and the periphery thereof on the first face of the head suspension according to the first embodiment.
Figure 4:
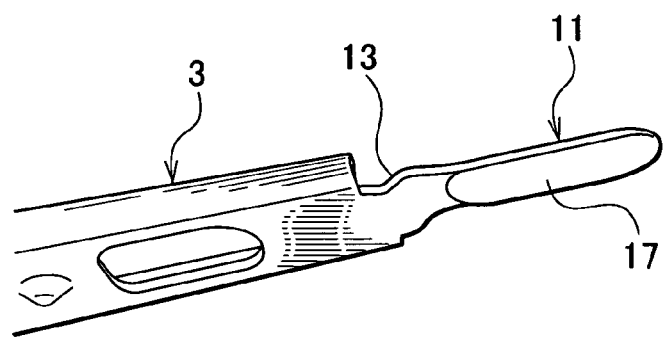
FIG. 4 is a perspective view showing the tab and the periphery thereof on the second face of the head suspension according to the first embodiment.
Figure 5:
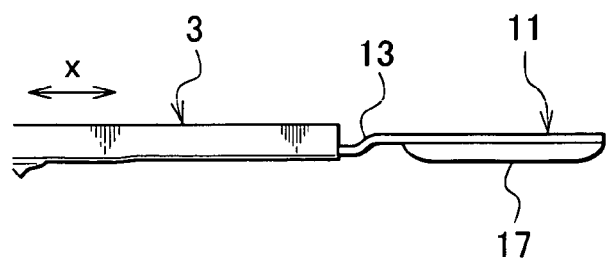
FIG. 5 is a side view showing the tab and the periphery thereof according to the first embodiment.
Figure 6:
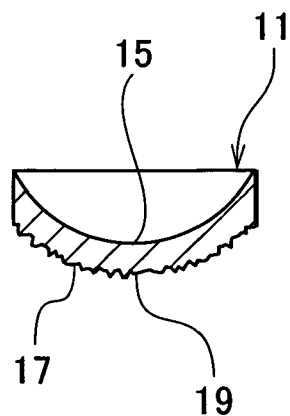
FIG. 6 is a sectional view showing the tab according to the first embodiment.

FIGS. 3 to 6 show the tab 11 and the periphery thereof, in which FIG. 3 is a perspective view showing the first face, FIG. 4 is a perspective view showing the second face, FIG. 5 is a side view, and FIG. 6 is a sectional view.

In FIG. 3 to 6, the load/unload tab 11 has a canoe shape. The tab 11 is extended in the longitudinal direction (arrow X) of the load beam 3 from a step 13 formed at a front end of the load beam 3. The tab 11 has a concave face 15 on the first face side and a convex face 17 on the second face side. The tab 11 is elongated in the longitudinal direction of the load beam 3. In FIG. 6, the tab 11 has an arcuate cross section. At least the outer face of the tab 11, i.e., the convex face 17 of the tab 11 that comes in contact with the ramp block is provided with microscopic irregularities 19.

The microscopic irregularities 19 function to reduce the frictional coefficient of the tab 11 with respect to the ramp block and restrict variations in the frictional coefficient. According to the first embodiment, the microscopic irregularities 19 are formed in the surface of a base material that forms the tab 11. The base material of the tab 11 is a metal plate that forms the load beam 3.

A center line average roughness "Ra" of the microscopic irregularities 19 is greater than 0.2 μm and equal to or smaller than 0.6 μm.

[Method of Processing the Tab of the Load Beam]

Figure 7:
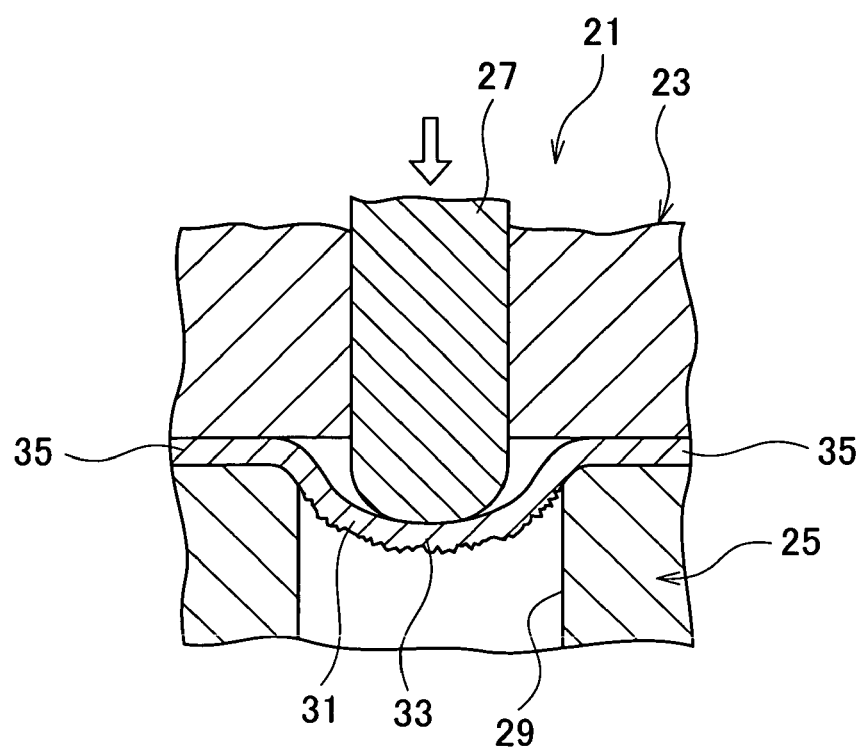
FIG. 7 is a sectional view partly showing a press for forming the tab of the first embodiment.

FIG. 7 is a sectional view partly showing a press for forming the tab 11. In FIG. 7, the press 21 has an upper mold 23 and a lower mold 25. The upper mold 23 has a punch 27, and the lower mold 25 has a relief long hole 29. The long hole 29 is elongated in a direction orthogonal to FIG. 7. The width of the punch 27 is narrower than the width of the tab 11, and the width of the long hole 29 is substantially equal to the width of the tab 11. The long hole 29 of the lower mold 25 provides an escape space for a part of the tab 11 where the microscopic irregularities 19 are formed.

The press 21 presses a metal base material 31 of the load beam 3, to form the microscopic irregularities 19 on the tab 11. The sizes of the irregularities 19 are dependent on crystal grain diameters of the material 31. The surface roughness "Ra" of the irregularities 19 is in the range of 0.2 μm to 0.6 μm.

Before the pressing work, the metal base material 31 is trimmed into the shape of the load beam 3.

The base material 31 is set on the lower mold 25, and the upper mold 23 is pressed against the lower mold 25, to form the load beam 3 into a predetermined shape. At this time, the punch 27 pushes the base material 31 into the long hole 29, to form a curved part 33 corresponding to the tab 11. This completes the tab 11 shown in FIG. 6.

The convex face 17 of the tab 11 receives no pressing force from the lower mold 25, and therefore, the microscopic irregularities exposed at the surface of the base material 31 due to the pressing work remain as they are. As a result, the tab 11 has the microscopic irregularities 19 whose sizes are dependent on the crystal grain diameters of the base material 31.

Comparison of Changes in Unload Force

Tester

Figure 8:
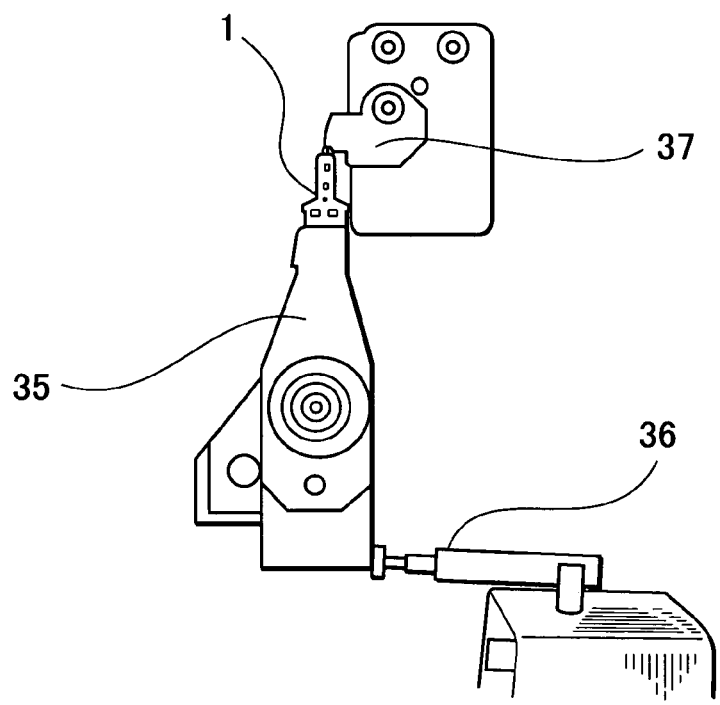
FIG. 8 is a view showing a tester for measuring unload force on a tab of a head suspension.

FIG. 8 is a general view roughly showing a tester for measuring unload force f. The tester includes an arm 35 to which a head suspension 1 to be tested is attached, a driving unit 36 for applying rotational force to the arm 35 through a load cell, and a ramp block 37 to guide the head suspension 1. The head suspension 1 slides along the ramp block 37.

The driving unit 36 turns the arm 35, and the head suspension 1 slides and climbs a slope of the ramp block 37. At this time, the load cell detects unload force.

(Tested Head Suspensions)

Figure 9A:
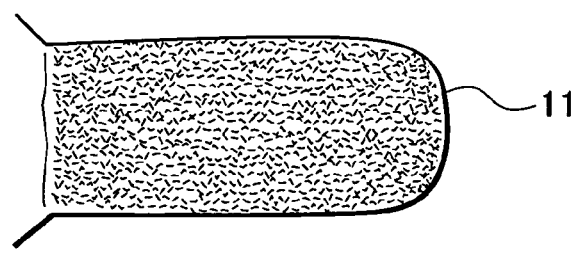
Figure 9B:
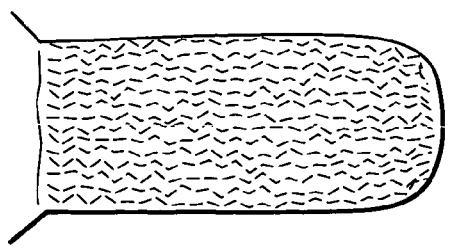
Figure 9C:
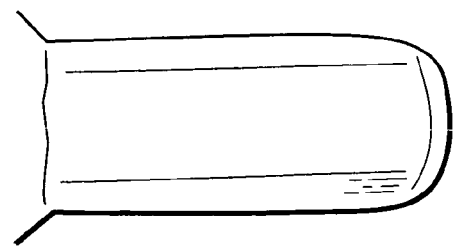

FIGS. 9A to 9C show tabs of head suspensions tested with the tester. FIG. 9A shows the tab 11 of the head suspension 1 according to the first embodiment of the present invention without a coining process, i.e., with a 0-μm coining process. FIG. 9B shows a tab of a comparative example treated with a 15-μm coining process and FIG. 9C shows a tab of a comparative example treated with a 19-μm coining process. In FIG. 9A, the tab 11 has the microscopic irregularities having a surface roughness "Ra" of 0.2 μm to 0.6 μm. The tabs of FIGS. 9B and 9C each have a surface roughness Ra of 0.01 μm to 0.2 μm. The surface roughness of the tab of FIG. 9C is smaller than that of the tab of FIG. 9B. In addition, tabs of comparative examples treated with 5-, 10-, and 12-μm coining processes were tested. The tabs treated with the 10-μm coining process or over each have a surface roughness Ra of 0.01 μm to 0.2 μm.

FIGS. 10 to 14 are graphs showing results of the tests carried out on these tabs.

Tests at Different Unload Speeds

Figure 10A:
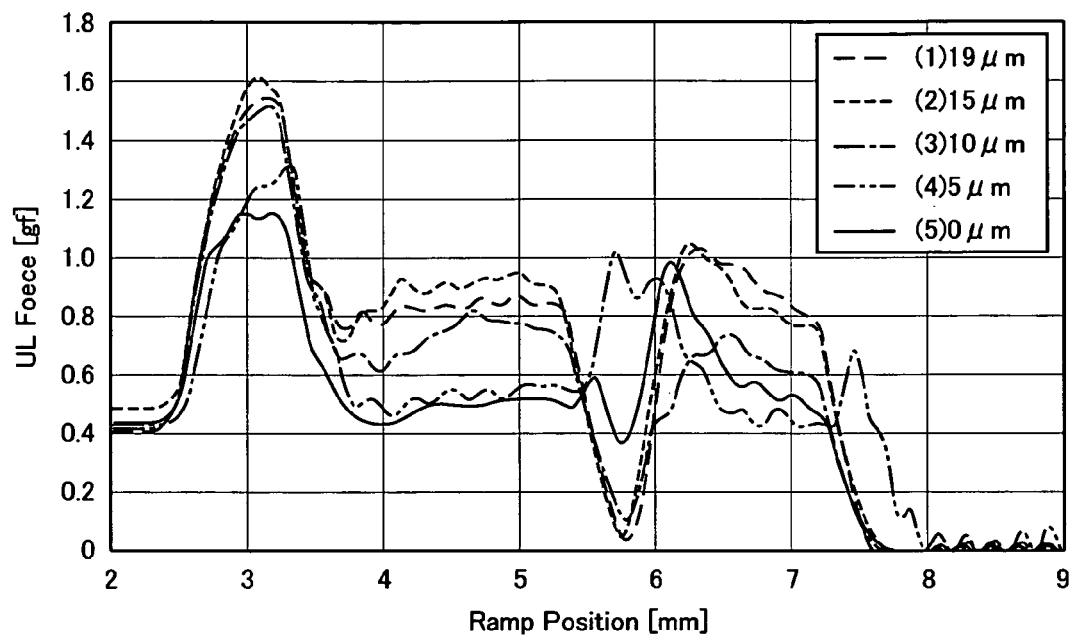
Figure 10B:
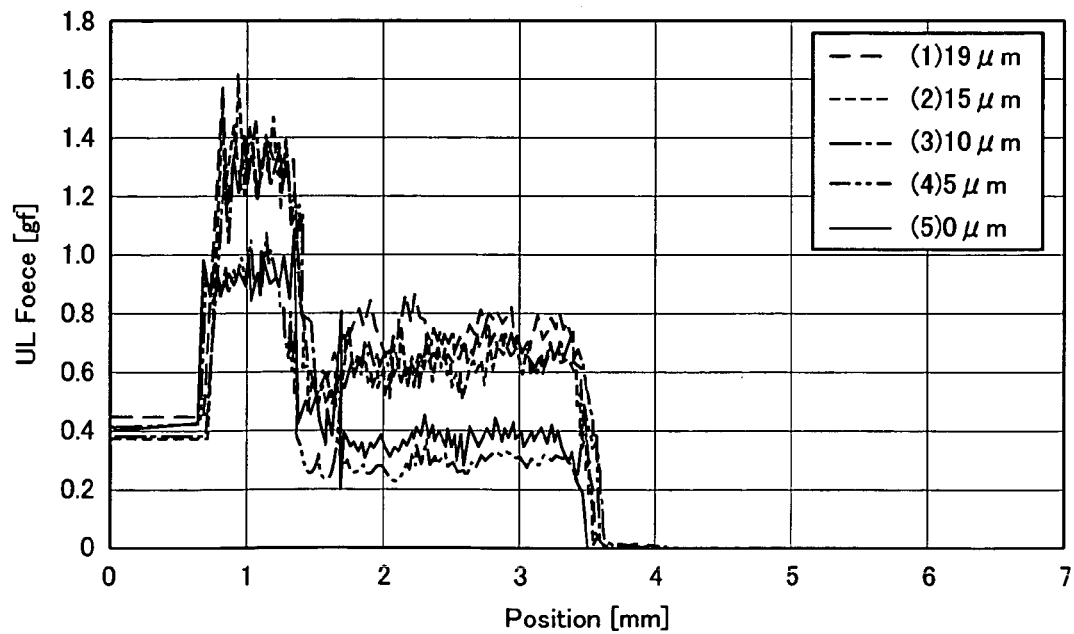

FIGS. 10A and 10B are graphs showing changes in unload force "f" according to changes in unload speed, in which FIG. 10A shows results of tests conducted at an unload speed of 20 mm/sec, and FIG. 10B shows results of tests conducted at an unload speed of 0.4 mm/sec. The tested head suspensions each have a load beam thickness "t" of 76 μm.

In FIGS. 10A and 10B, an abscissa represents a distance (ramp position (mm)) for which the tab has slid along the ramp block, and an ordinate represents unload force f (gf). In FIG. 10A, rightward-increasing curves at the left of the graph indicate that each tab is climbing the ramp block. When the tab completely climbs the slope of the ramp block and moves to a horizontal part (retract position) of the ramp block, the unload force f sharply decreases rightward. Thereafter, the unload force is dependent on a frictional coefficient.

It is confirmed from FIGS. 10A and 10B that the tab 11 of the present invention provided with the microscopic irregularities 19 shows, at any unload speed, a small frictional coefficient compared with the head suspensions having no irregularities due to the coining processes.

In FIG. 10A, the tabs treated with the 10-, 15-, and 19-μm coining processes to have a surface roughness Ra of 0.01 μm to 0.2 μm show increased unload force f compared with the tab of the present invention without the coining process, i.e., the 0-μm coining process. For example, at the position just after the slope of the ramp block, the head suspension 1 of the present invention shows an unload force f of 1.2 gf or below, while each of the comparative examples shows an increased unload force f of about 1.6 gf. The difference of unload force between the present invention and the comparative examples is about 0.4 gf. A similar tendency is observed in FIG. 10B.

Tests at Different Temperatures

Figure 11A:
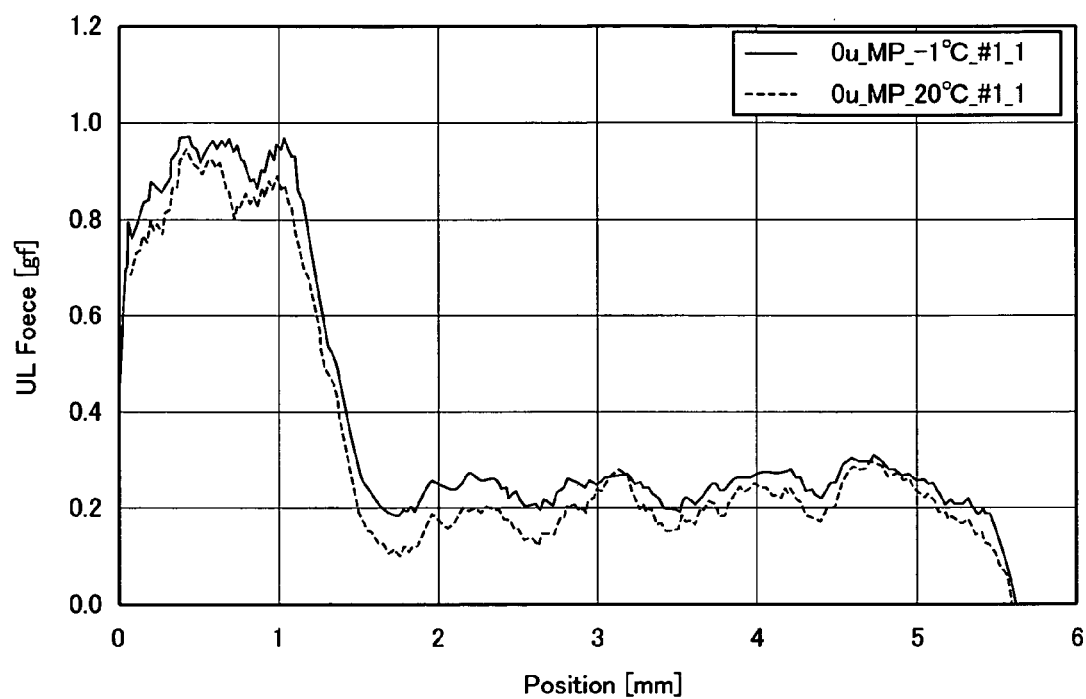
FIGS. 11A and 11B are graphs showing changes in unload force relative to temperature changes on head suspensions having different plate thicknesses according to the first embodiment.
Figure 11B:
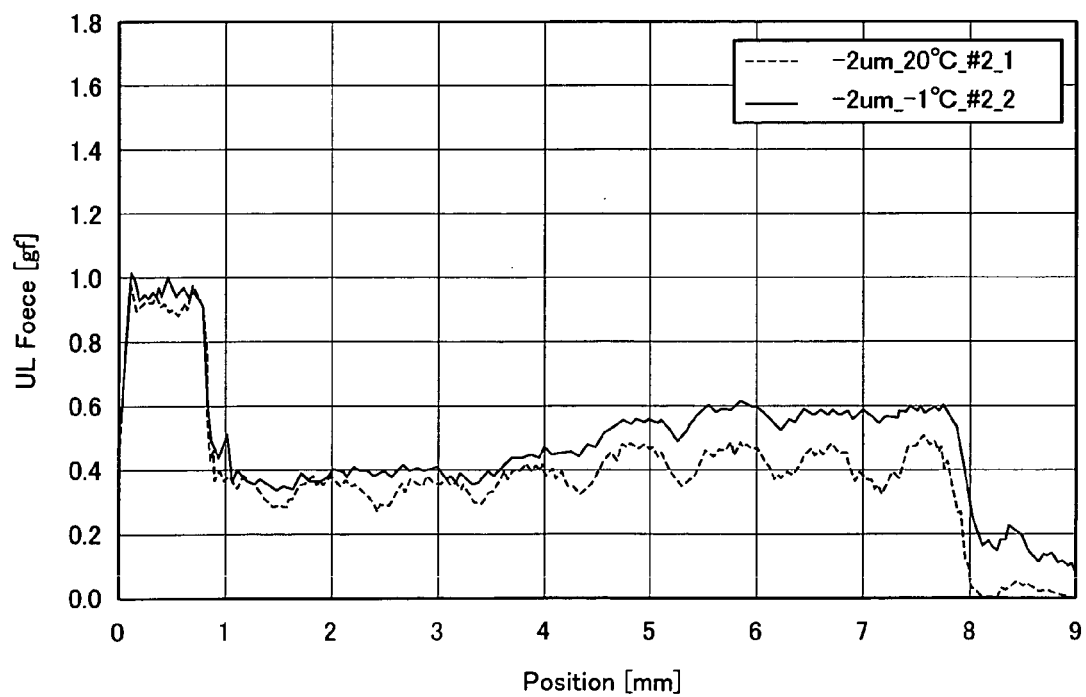
Figure 12A:
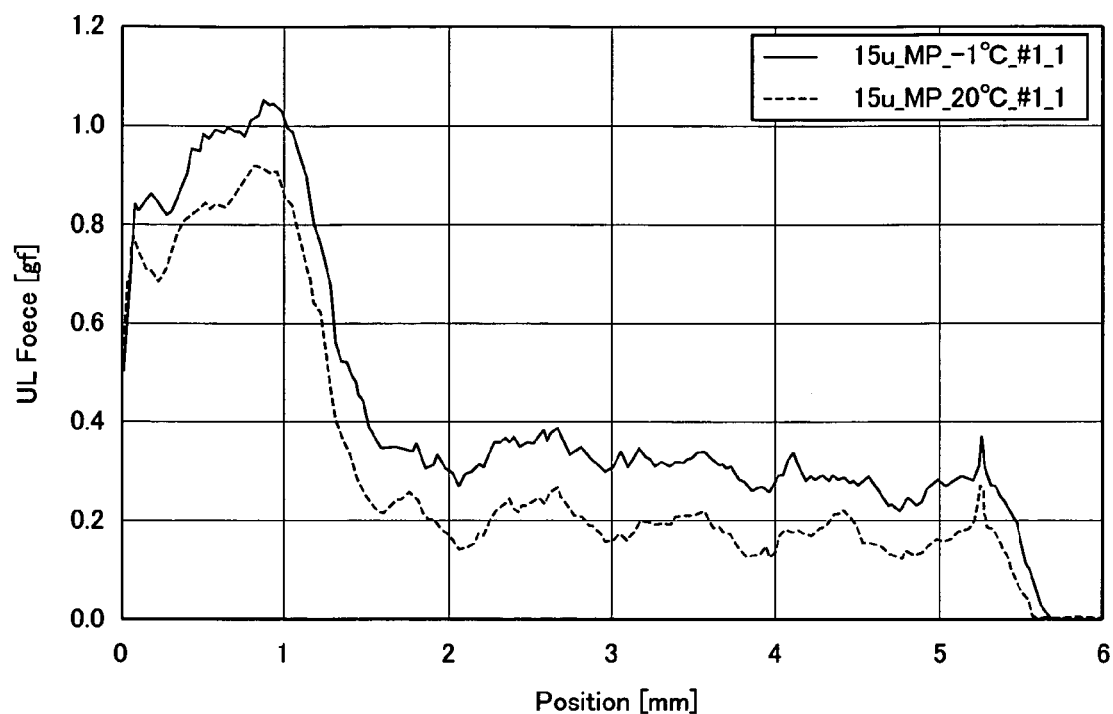
FIGS. 12A and 12B are graphs showing changes in unload force relative to temperature changes on head suspensions of comparative examples having different plate thicknesses and subjected to 15- and 12-μm coining processes.
Figure 12B:
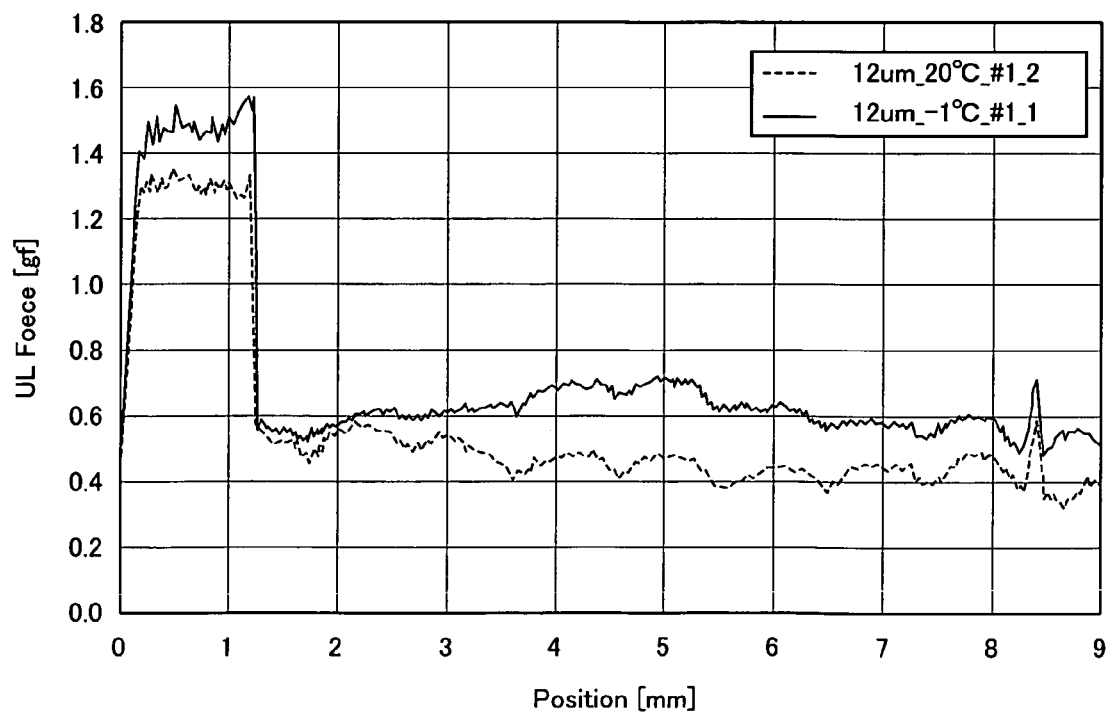

FIGS. 11A, 11B, 12A, and 12B are graphs showing changes in unload force f relative to changes in temperature, in which FIGS. 11A and 11B show test results of the head suspension 1 according to the present invention and FIGS. 12A and 12B show test results of head suspensions of comparative examples treated with 15- and 12-μm coining processes.

The load beams of the head suspensions of the test results shown in FIG. 11A and 12A each have a plate thickness of 76 μm, and those of FIGS. 11B and 12B each have a plate thickness of 51 μm. Namely, the structures of the head suspensions of FIGS. 11B and 12B are equal to each other, and differs from those of FIGS. 11A and 12A. Unload speed is 0.4 mm/sec. The abscissa and ordinate of each graph of FIGS. 11A to 12B are the same as those of FIGS. 10A and 10B. Changes in unload force on the slope of the ramp block and at the horizontal part of the ramp block observed in FIGS. 11A to 12B substantially correspond to those of FIGS. 10A and 10B.

In FIGS. 11A to 12B, the tests were conducted at −1° C. and +20° C. In each graph of FIGS. 11A to 12B, one curve relates to the test at −1° C. and the other to the test at +20° C. These temperatures in the tests were realized by blowing air at the temperatures to the ramp block.

Generally, plastics increase frictional force as the temperature decreases. The test results shown in FIGS. 11A to 12B show that, without regard to temperature changes, the head suspension 1 of the present invention demonstrates little variation in unload force compared with the comparative examples.

As is apparent in FIGS. 11A and 11B, the head suspension 1 of the present invention shows substantially no difference between the two temperatures in each of the structures having different plate thicknesses. On the other hand, the comparative examples of FIGS. 12A and 12B show a difference of about 0.1 to 0.2 gf in unload force between the two temperatures in each of the structures having different plate thicknesses.

Tests with Ramp Blocks of Different Materials

Figure 13A:
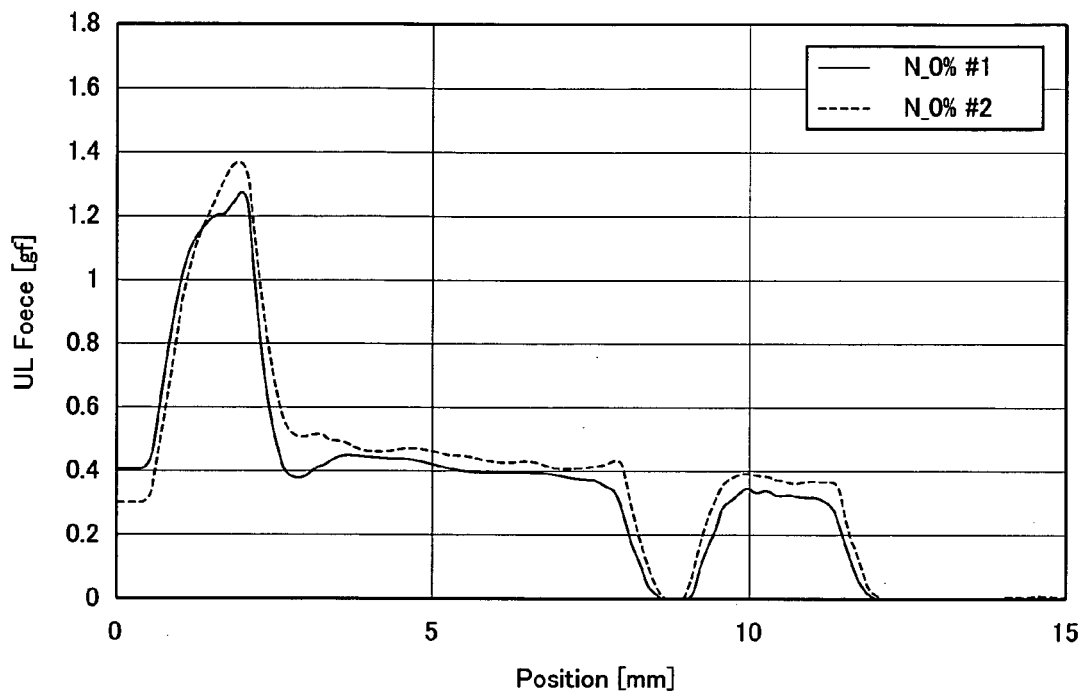
FIG. 13A is a graph showing unload force on a head suspension subjected to 0-μm coining process according to the first embodiment of the present invention.
Figure 13B:
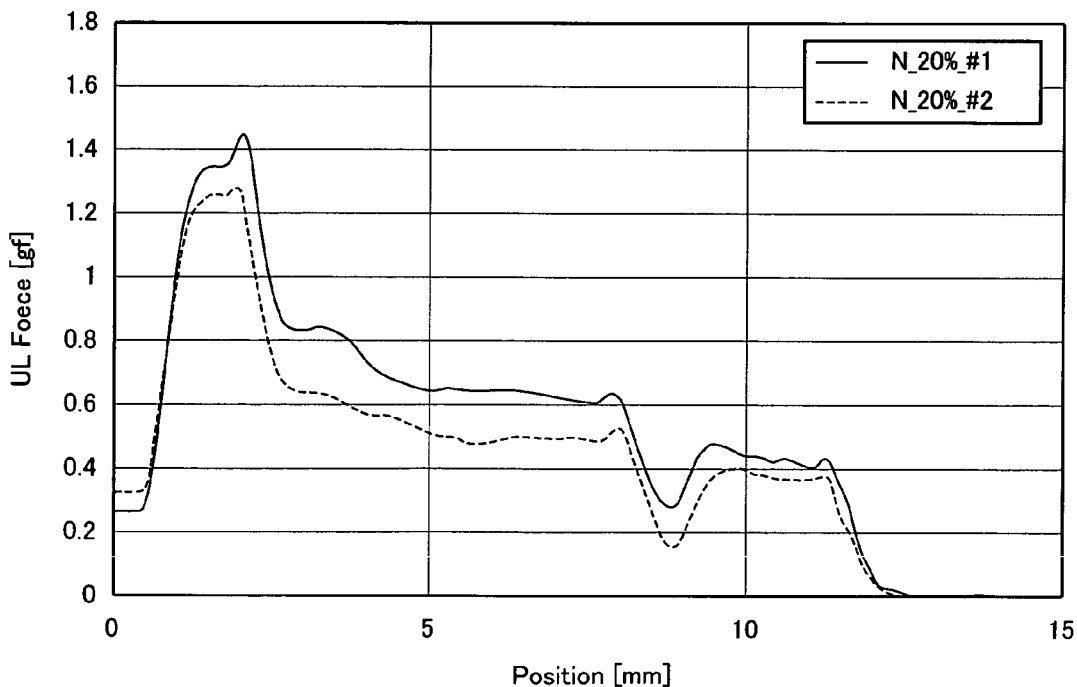
FIG. 13B is a graph showing unload force on a head suspension of a comparative example subjected to a 10-μm coining process.
Figure 14A:
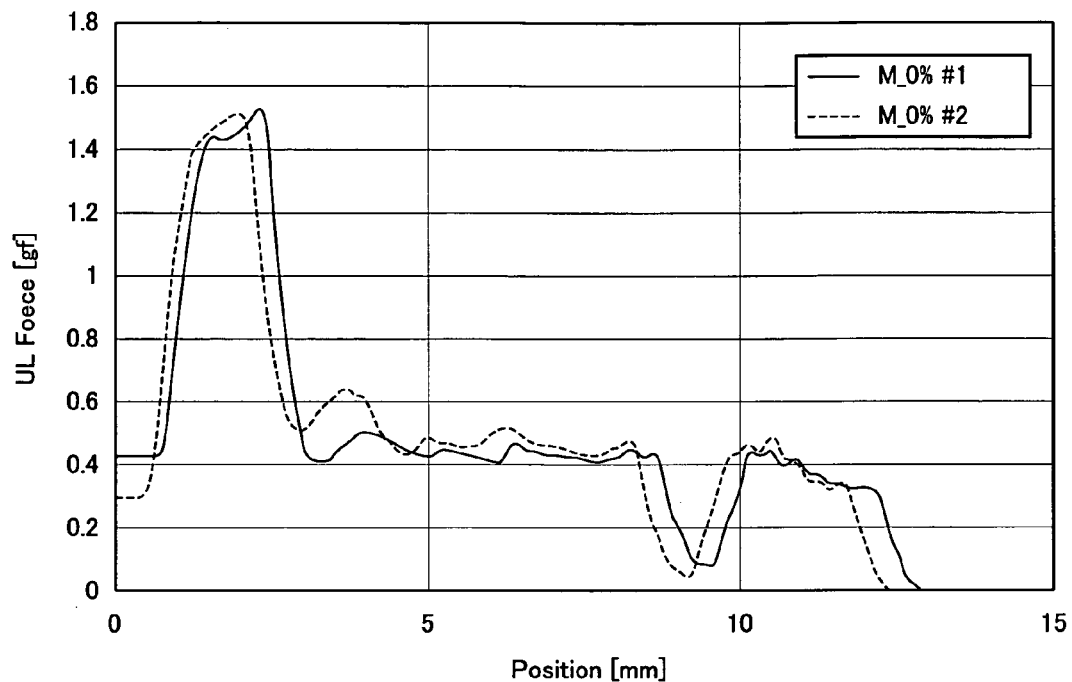
FIG. 14A is a graph showing unload force on a head suspension subjected to 0-μm coining process according to the first embodiment of the present invention.
Figure 14B:
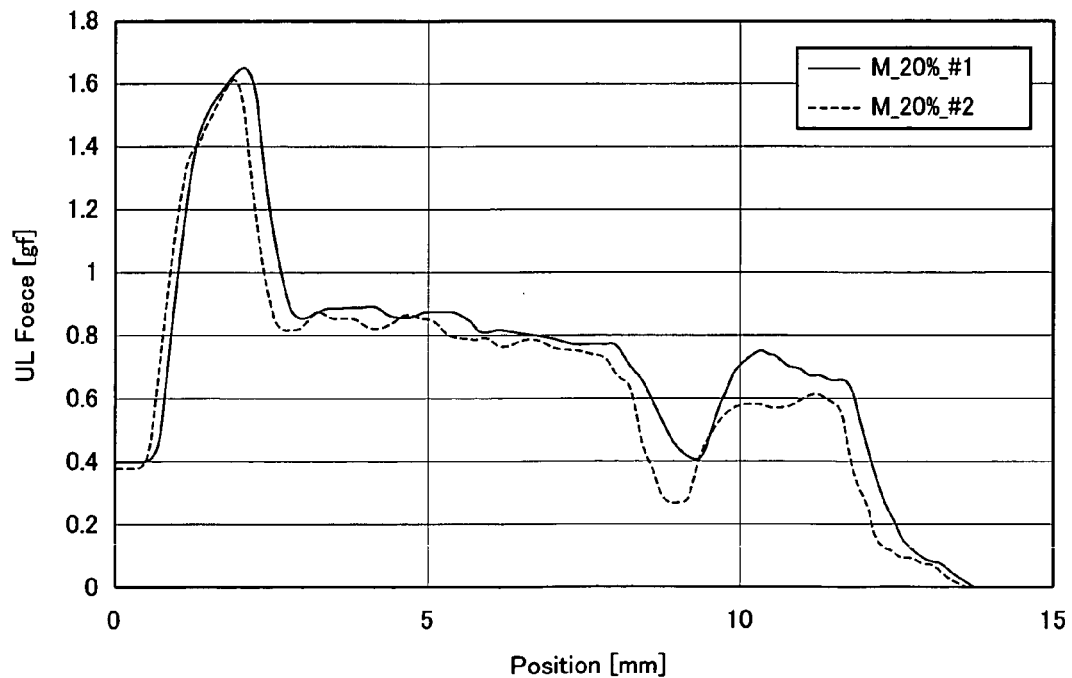
FIG. 14B is a graph showing unload force on a head suspension of a comparative example subjected to a 10-μm coining process.

FIGS. 13A to 14B show changes in unload force f with respect to ramp blocks made of different materials, in which FIGS. 13A and 14A relate to the head suspension 1 of the present invention without a coining process and FIGS. 13B and 14B relate to a head suspension of a comparative example treated with a 20% (10 μm) coining process. FIGS. 13A and 13B employ a ramp block of the same material, and FIGS. 14A and 14B employ a ramp block made of a material that is different from the material of FIGS. 13A and 13B. The materials of the ramp blocks are polyacetal-based materials of different kinds.

Each graph shown in FIGS. 13A to 14B has two curves representing two tests #1 and #2 carried out with the same ramp block.

In each test of FIGS. 13A to 14B, the head suspensions have the same structure with the load beam having a thickness of 51 μm. Unload speed is 15 mm/sec. The abscissa and ordinate of each graph in FIGS. 13A to 14B are the same as those of FIGS. 10A and 10B. The tests of FIGS. 13A to 14B were conducted with a hard disk drive that is different from that used for the tests of FIGS. 10A and 10B.

The test results of FIGS. 13A to 14B show that the head suspension 1 of the present invention demonstrates little change in unload force f irrespective of the material of the ramp block.

As is apparent in FIGS. 13A and 14A, the head suspension 1 of the present invention shows substantially no change in unload force f without regard to the material of the ramp block. On the other hand, the graphs of FIGS. 13B and 14B show that the comparative example increases friction and unload force f depending on the material of the ramp block.

The comparative example treated with a 20% (10 μm) coining process shows an increase in friction, while the present invention without a coining process, i.e., 0-μm coining process shows substantially no increase in friction. It is understood that the coining process magnifies a frictional difference depending on the material of the ramp block.

Wear After Durability Tests

Figure 15A:
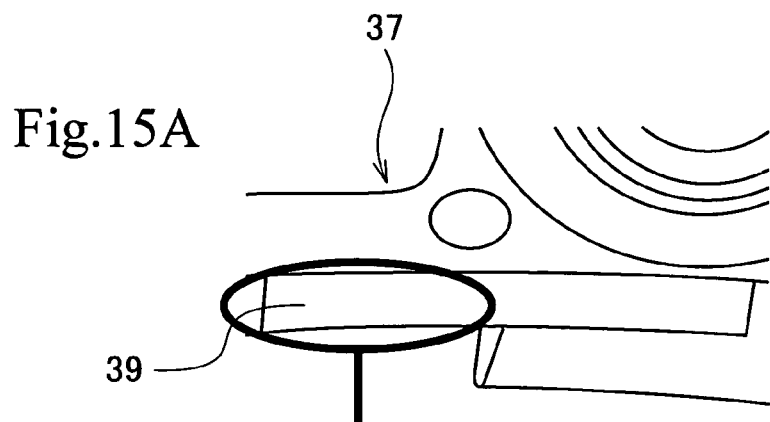
Figure 15B:
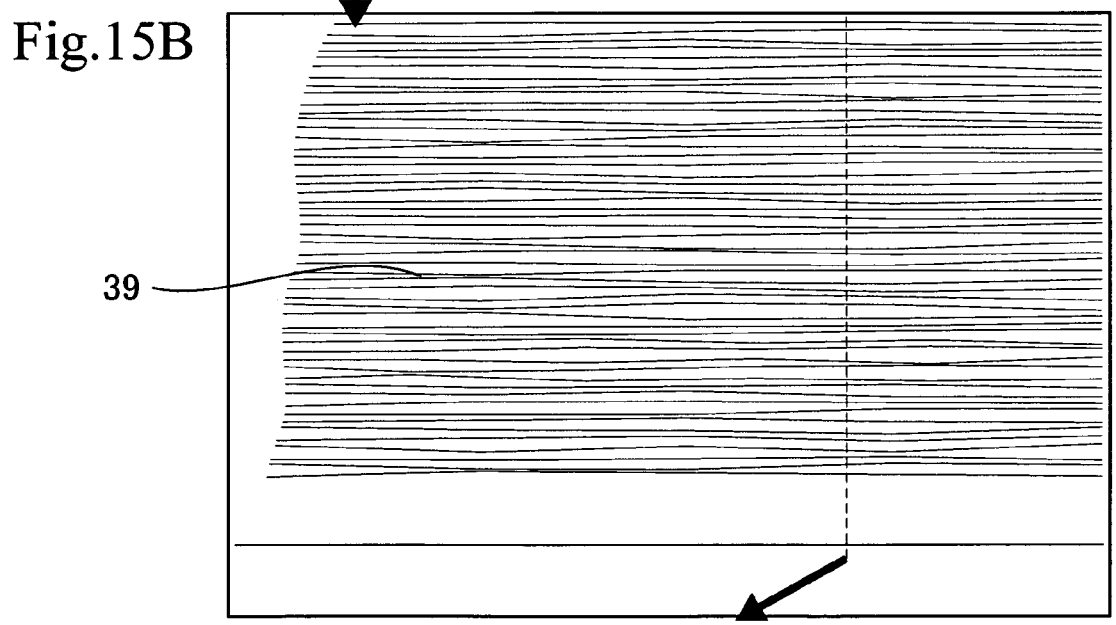
Figure 15C:
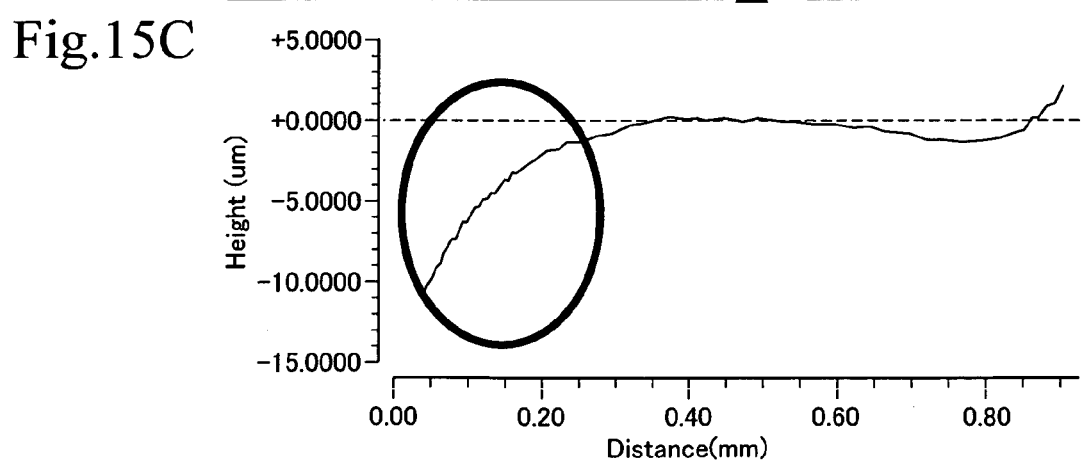

FIGS. 15A to 16C show worn states of the slopes of ramp blocks after durability tests, in which FIGS. 15A and 16A are perspective views partly showing the slopes, FIGS. 15B and 16B are enlarged perspective views partly showing the slopes, and FIGS. 15C and 16C are graphs showing changes in wear. FIGS. 15A to 15C relate to the head suspension 1 of the present invention and FIGS. 16A to 16C relate to a head suspension of a comparative example treated with a 20% coining process. In FIGS. 15C and 16C, an abscissa represents a moving distance (mm) on the slope of the ramp block and an ordinate represents a height (μm) at the surface of the slope. Each durability test involves 700,000 times of load/unload operation.

As is apparent in FIGS. 15A to 16C, the head suspension 1 of the present invention shows no conspicuous wear on the slope 39 of the ramp block 37 after the durability test. On the other hand, the comparative example shows large wear on the slope 39. Namely, the surface of the slope 39 of the comparative example is damaged.

Changes in Unload Force After Durability Tests

FIGS. 17A to 21B show changes in unload force and surface roughness before and after durability tests, in which FIGS. 17A to 21A show changes in unload force before and after the durability tests and FIGS. 17B to 21B show the surface roughness Ra of each tab after the durability tests.

FIGS. 17A, 17B, 19A, and 19B relate to head suspensions according to the present invention, and FIGS. 18A, 18B, 20A, 20B, 21A, and 21B relate to head suspensions of comparative examples treated with polishing processes. Each durability test involves 700,000 times of load/unload operation.

Figure 19A:
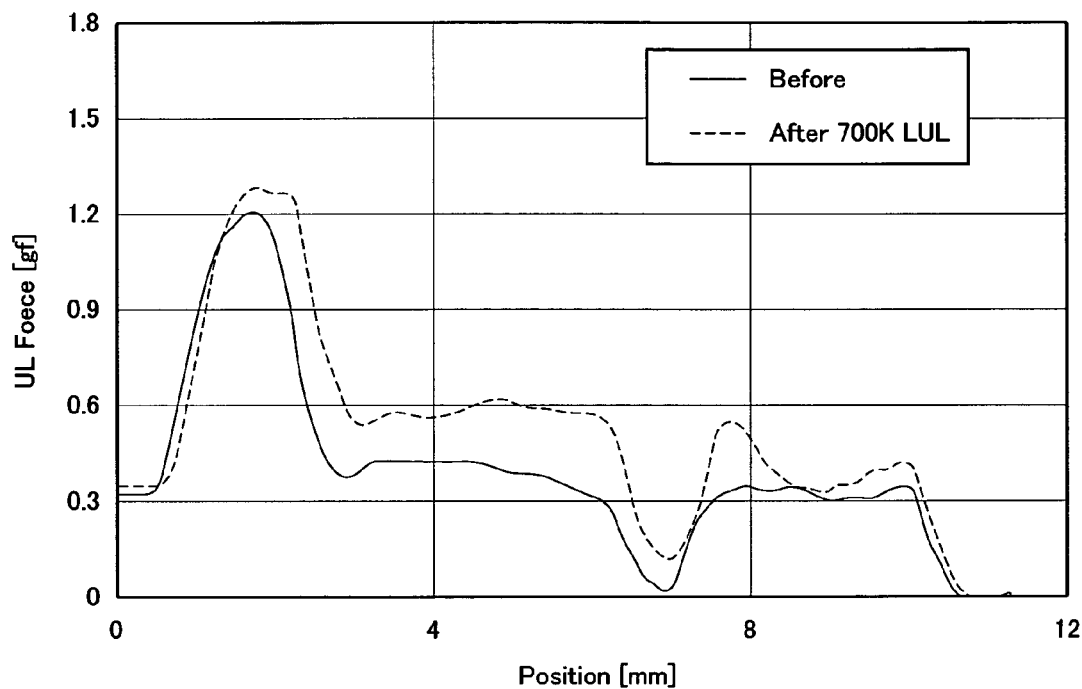
Figure 19B:
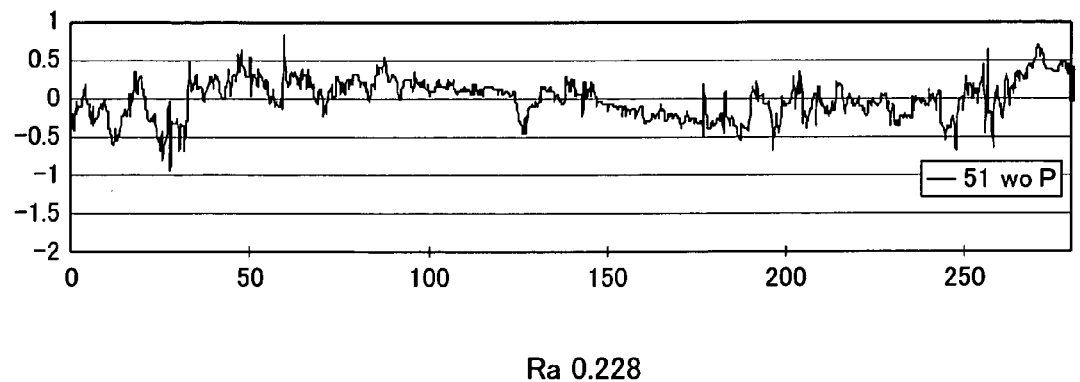
Figure 20A:
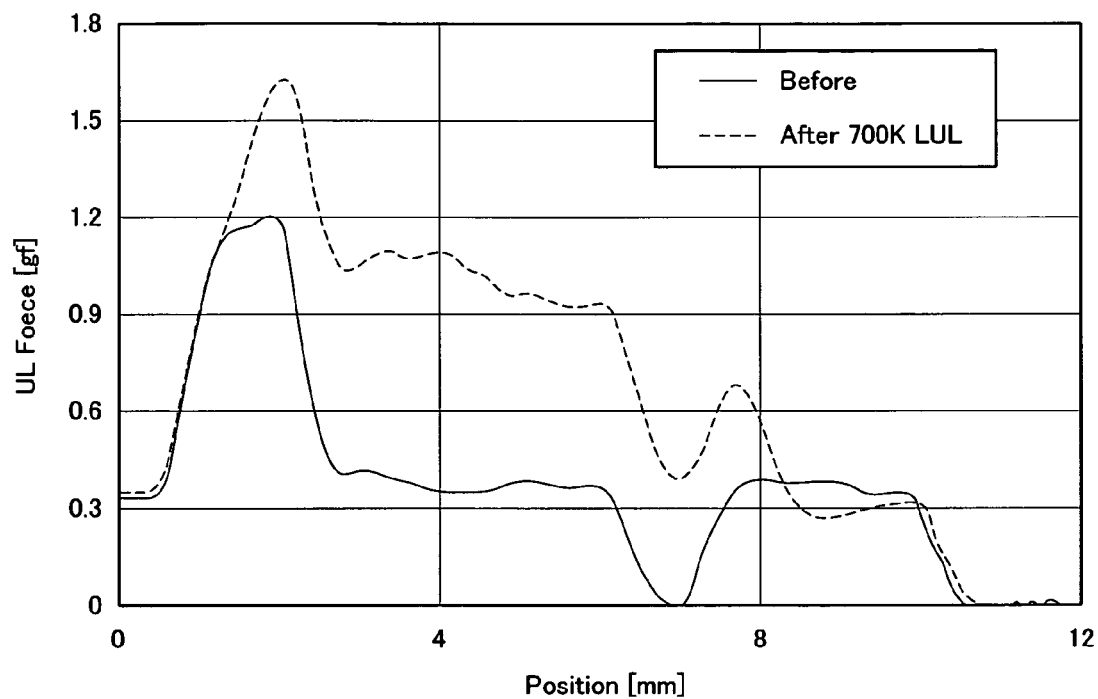
Figure 20B:
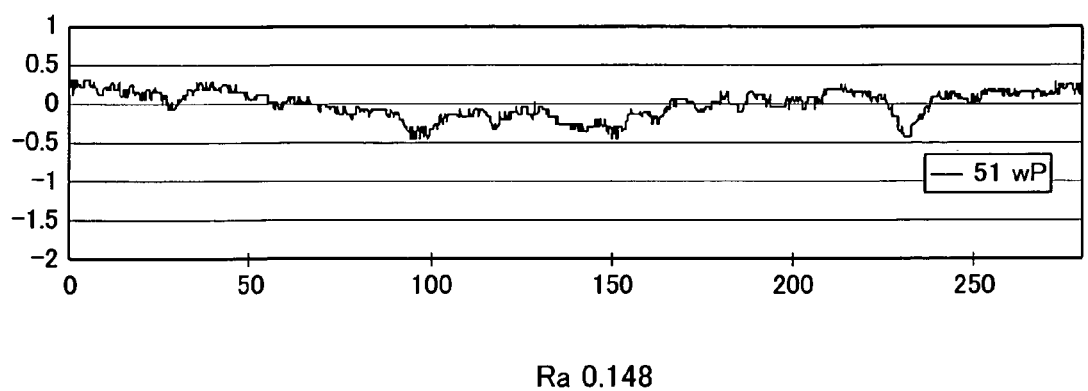
Figure 21A:
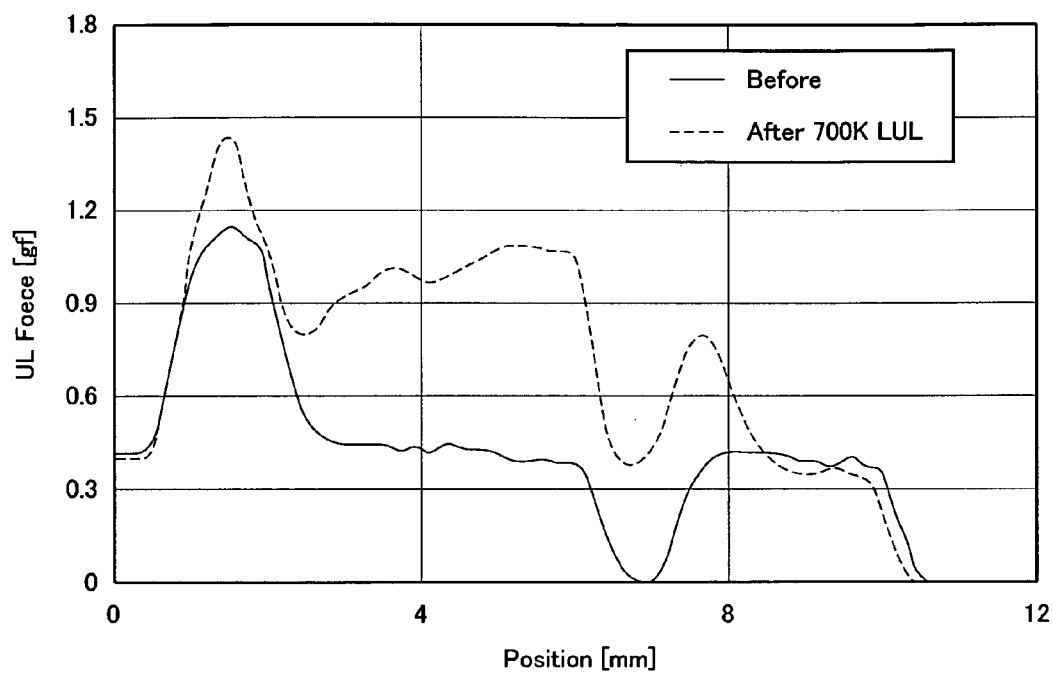
Figure 21B:
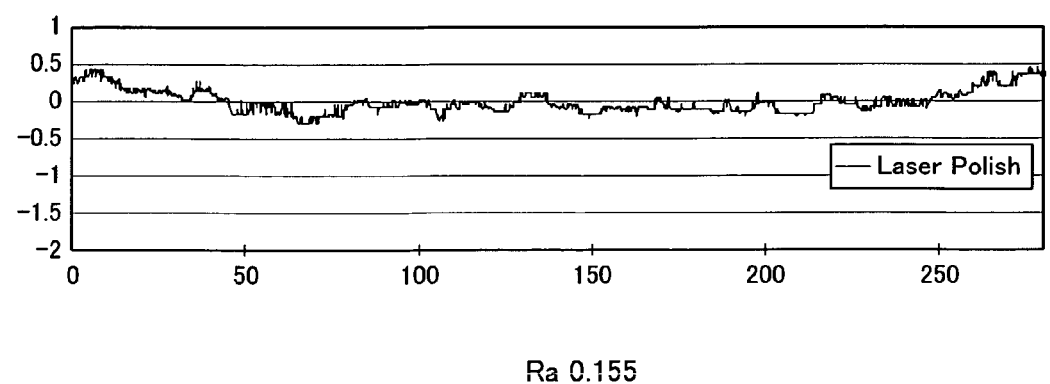
Figure 24:
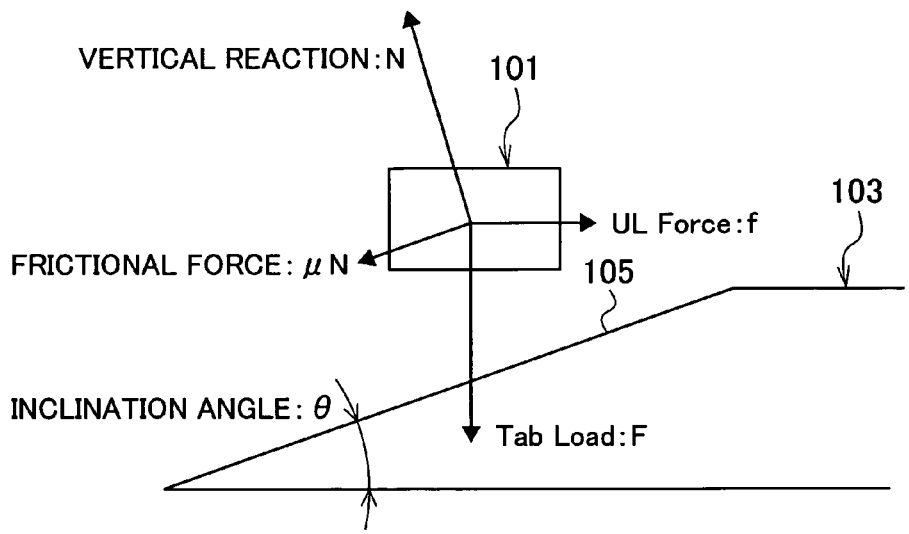
FIG. 24 is a view explaining force acting on a tab of a head suspension when the tab is slid and guided along a ramp block.
Figure 25:
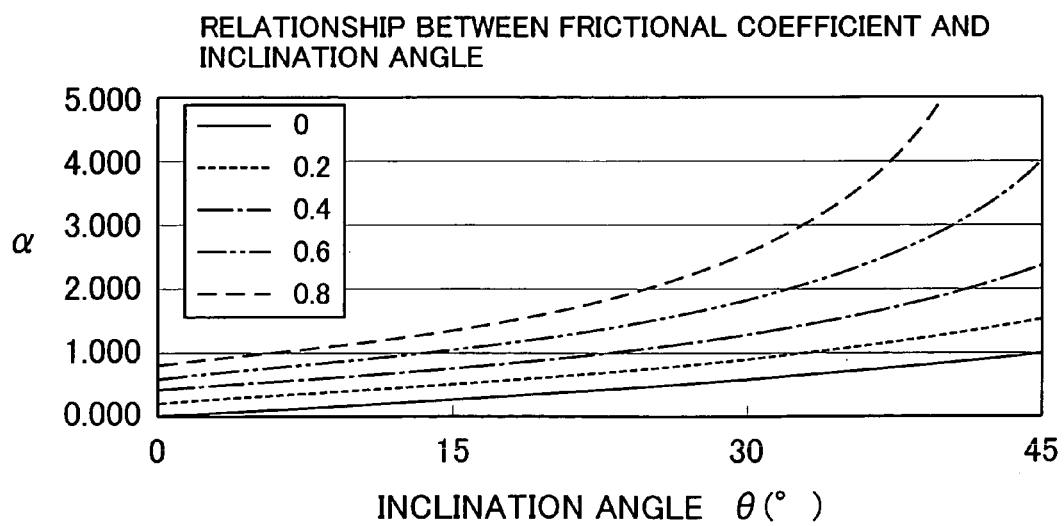
FIG. 25 is a graph showing relationships among frictional coefficients, inclination angles, and unload force.
Figure 26:
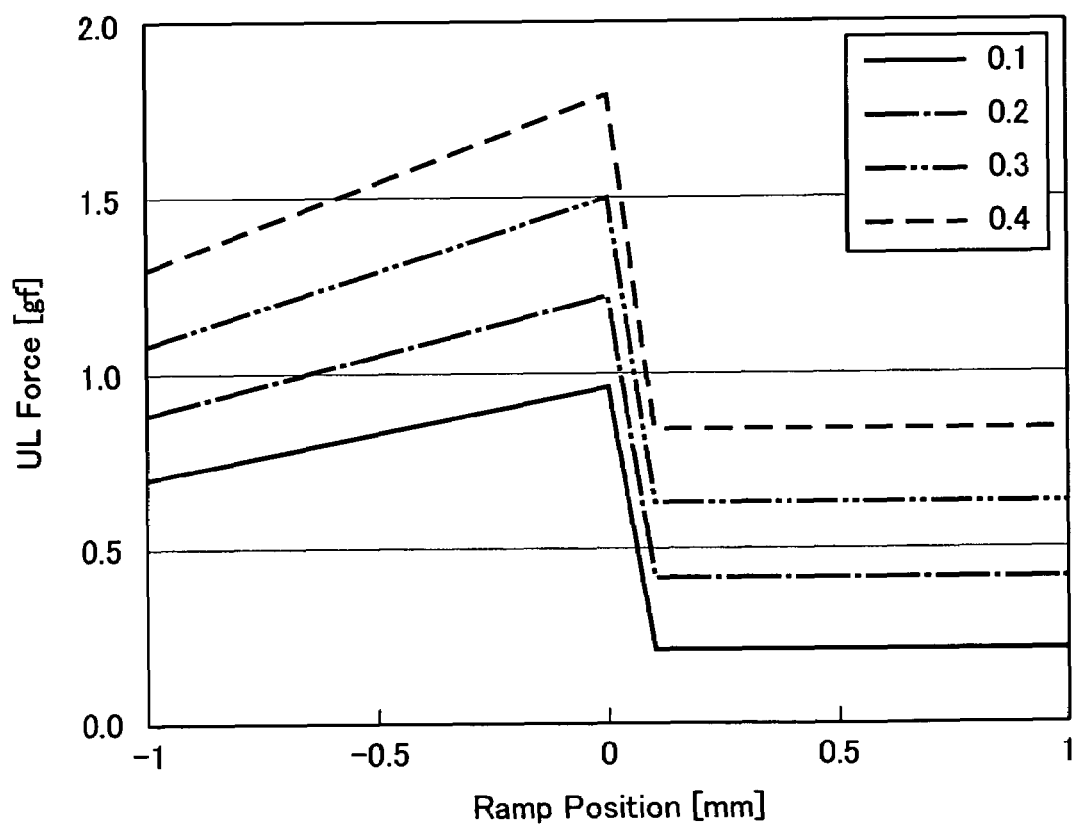
FIG. 26 is a graph showing unload force f calculated with different frictional coefficients.

The head suspensions used in the tests of FIGS. 17A to 18B each have a load beam thickness of 76 μm, those used in the tests of FIGS. 19A to 20B each have a load beam thickness of 38 μm, and those used in the tests of FIGS. 21A and 21B each have a load beam thickness of 30 μm. Unload speed is 15 mm/sec in each test.

Figure 17A:
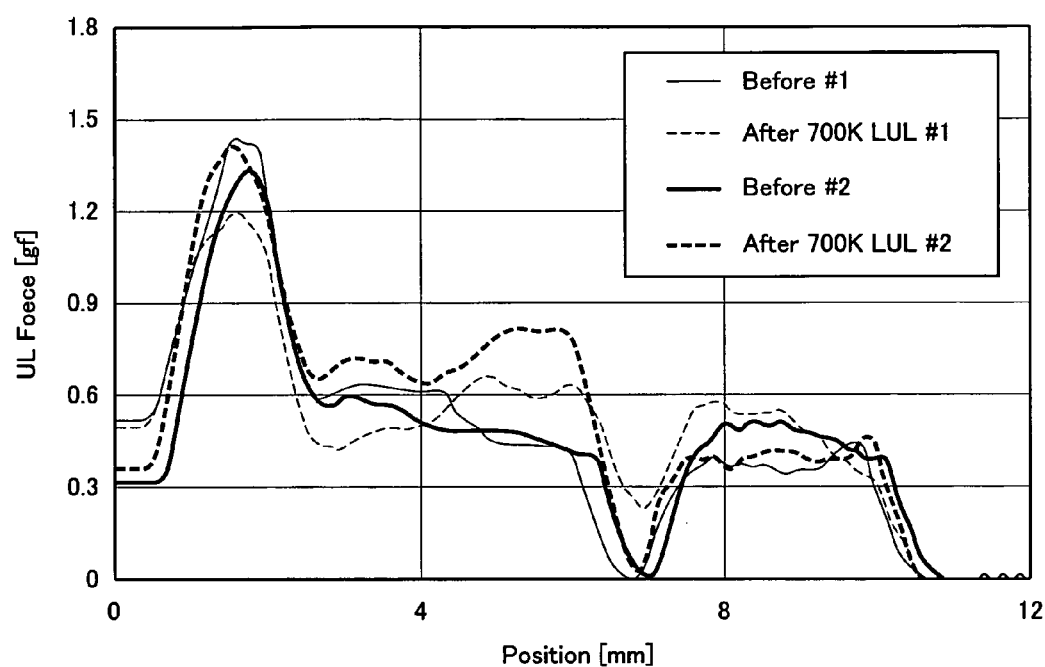
Figure 17B:
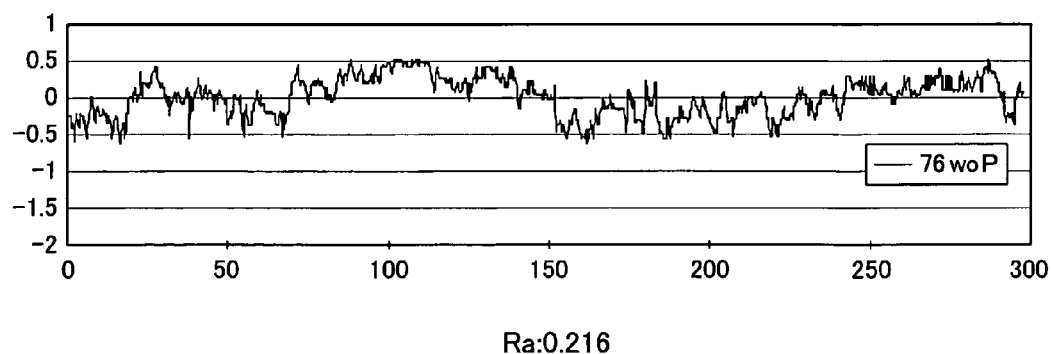
Figure 18A:
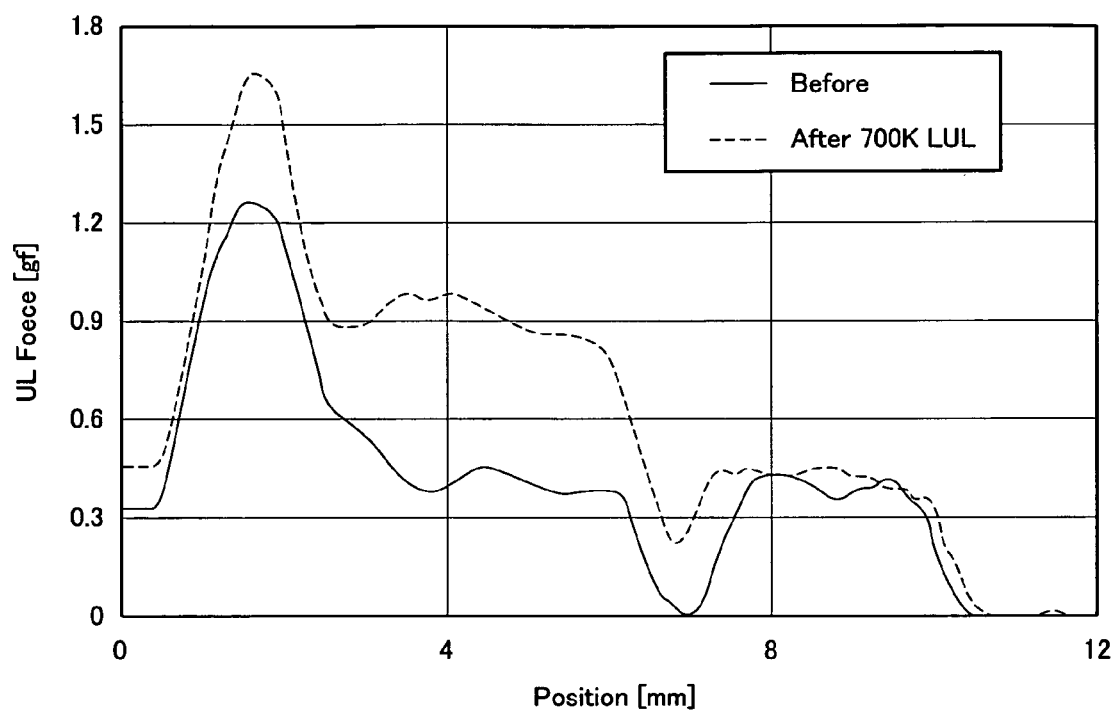
Figure 18B:
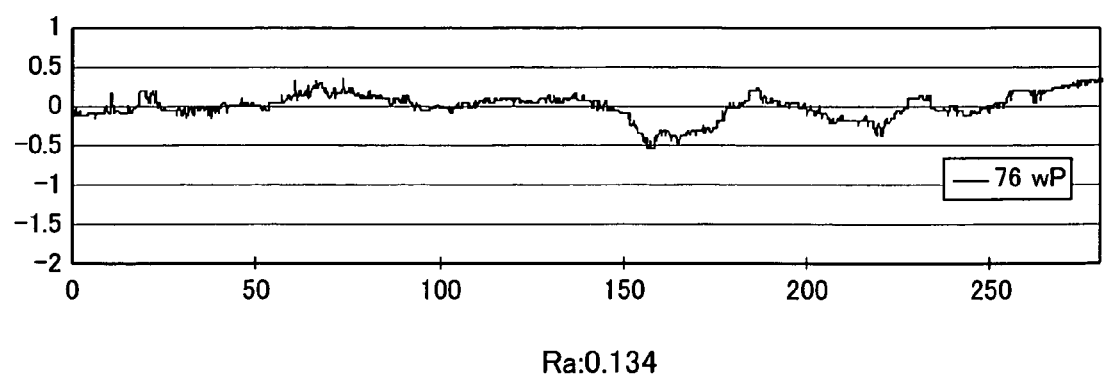

FIG. 17A shows four curves representing two sets of test result data, each set including data taken before and after a durability test. The tests were carried out with ramp blocks of the same material. FIGS. 18A to 21A each show a set of test result data taken before and after a durability test.

In FIGS. 17A to 21A, the abscissa and ordinate are the same as those of FIGS. 10A and 10B. Changes in unload force at the slope and horizontal part of the ramp block in each of FIGS. 17A to 21A resemble those of FIGS. 10A and 10B As is apparent in the graph of FIG. 17A, the head suspension 1 of the present invention shows substantially no change in unload force f before and after the durability test without regard to the material of the ramp block. On the other hand, the graph 18A of the comparative example shows a great increase in unload force f after the durability test. In FIG. 17B, the tab of the head suspension 1 of the present invention maintains, after the durability test, a surface roughness Ra of 0.216. On the other hand, the tab of the comparative example of FIG. 18B shows a surface roughness Ra of 0.134 after the durability test.

In FIG. 19A, the head suspension 1 of the present invention shows substantially no change in unload force f before and after the durability test. On the other hand, the comparative example of FIG. 20A shows a great increase in unload force f after the durability test. In FIG. 19B, the tab of the head suspension 1 of the present invention maintains a surface roughness of 0.228 after the durability test. On the other hand, the comparative example of FIG. 20B shows a surface roughness of Ra=0.148 after the durability test.

The comparative example of FIG. 21A also shows a great increase in unload force f after the durability test. In FIG. 21B, the comparative example shows a surface roughness Ra of 0.155 after the durability test.

In this way, the head suspension 1 of the present invention with the tab 11 provided with the microscopic irregularities 19 is apparently superior to any tab treated with a coining process or a polishing process to remove irregularities. Namely, the head suspension of the present invention is superior in reducing a frictional coefficient of the tab relative to a ramp block and suppressing variations in the frictional coefficient.

Consequently, the head suspension 1 of the present invention can suppress unload force f, reduce the wearing of a ramp block, and smoothly unload the head suspension regardless of materials of a ramp block, an environment of temperature of the ramp block, and unload speed.

Second Embodiment

FIGS. 22A and 22B show a load beam of a head suspension according to the second embodiment of the present invention, in which FIG. 22A is a side view partly showing the load beam and FIG. 22B is a perspective view partly showing the load beam.

The load beam 3A of the second embodiment has a step 13A from which a tab 11A is extended. The tab 11A has a spherical convex face 17A which is provided with microscopic irregularities 19A. A surface roughness Ra of the irregularities 19A is set in the range of 0.2 μm to 0.6 μm.

With the microscopic irregularities 19A, the second embodiment provides the same effect and operation as those of the first embodiment.

Third Embodiment

FIG. 23 is a sectional view partly showing a press used to process a head suspension according to the third embodiment of the present invention. In FIG. 23, the press 21B has an upper mold 23B and a lower mold 25B. The upper mold 23B has a punch 27B. The lower mold 25B has microscopic irregularities 41 to form irregularities 19B of a tab 11B of the head suspension. The irregularities 41 are adjusted to realize a roughness Ra of 0.2 μm to 0.6 μm on the tab 11B.

The press 21B forms the load beam so that the tab 11B of the load beam may have a convex face 17B which is provided with the microscopic irregularities 19B.

Accordingly, the third embodiment realizes substantially the same effect and operation as those of the first embodiment. According to the third embodiment, the roughness of the irregularities 41 of the lower mold 25B is adjusted to correctly set a required roughness for the irregularities 19B of the tab 11B.

The microscopic irregularities of the tab may be formed by electrolytic polishing or with the use of a laser.

Fourth Embodiment

The fourth embodiment of the present invention employs the metal molds shown in FIG. 23. The lower mold 25B according to the fourth embodiment, however, is provided with no irregularities. When pressing a tab 11 of a load beam, a coining process is carried out from a state in which the lower mold is in contact with the tab to a (5/76×100%) separated state, to thereby form irregularities having a surface roughness Ra of 0.2 μm to 0.6 μm.

The fourth embodiment realizes substantially the same effect and operation as those of the first embodiment.

The microscopic irregularities on the tab of any one of the embodiments of the present invention may be formed by using rolling marks (having a surface roughness determined by crystal grain diameters) that are present on the surface of a material of the tab.

What is claimed is:

1. An load/unload-type head suspension, comprising:
   a head;
   a guided part that is connected to the head and slid and guided along a guide in a read/write apparatus, to move the head away from a read/write medium to a retracted position;
   the guided part having irregularities formed on the guided part, configured to come in contact with the guide when the guided part is slid and guided along the guide;
   a center line average roughness "Ra" of the irregularities being greater than 0.2 μm and equal to or smaller than 0.6 μm.

2. An load/unload-type head suspension, comprising:
   a head;
   a guided part that is connected to the head and slid and guided along a guide in a read/write apparatus, to move the head away from a read/write medium to a retracted position;
   the guided part having irregularities formed on the guided part, configured to come in contact with the guide when the guided part is slid and guided along the guide;
   the irregularities being of a surface of a material from which the guided part is formed; and
   a center line average roughness "Ra" of the irregularities being greater than 0.2 μm and equal to or smaller than 0.6 μm.

* * * * *